(12) United States Patent
Hokii et al.

(10) Patent No.: US 8,182,599 B2
(45) Date of Patent: May 22, 2012

(54) CARBON-CONTAINING REFRACTORY, PRODUCTION METHOD THEREOF, AND PITCH-CONTAINING REFRACTORY RAW MATERIAL

(75) Inventors: Toshiyuki Hokii, Kitakyushu (JP);
Hiroyuki Fuchimoto, Kitakyushu (JP);
Toshihiro Suruga, Kitakyushu (JP);
Jyouki Yoshitomi, Kitakyushu (JP);
Keisuke Asano, Kitakyushu (JP)

(73) Assignee: Krosaki Harima Corporation, Kitakyushu-shi (JP)

( * ) Notice: Subject to any disclaimer, the term of this patent is extended or adjusted under 35 U.S.C. 154(b) by 757 days.

(21) Appl. No.: 11/989,199

(22) PCT Filed: Jul. 21, 2006

(86) PCT No.: PCT/JP2006/314524
§ 371 (c)(1),
(2), (4) Date: Jan. 22, 2008

(87) PCT Pub. No.: WO2007/011038
PCT Pub. Date: Jan. 25, 2007

(65) Prior Publication Data
US 2009/0044723 A1     Feb. 19, 2009

(30) Foreign Application Priority Data
Jul. 22, 2005 (JP) .................. 2005-213531

(51) Int. Cl.
*C08L 95/00* (2006.01)
*B29C 59/00* (2006.01)
(52) U.S. Cl. ........................ 106/284; 264/122
(58) Field of Classification Search .......... None
See application file for complete search history.

(56) References Cited

U.S. PATENT DOCUMENTS
3,368,010 A * 2/1968 Cummings, Sr. ............. 264/122
(Continued)

FOREIGN PATENT DOCUMENTS
GB     1354887     5/1974
(Continued)

OTHER PUBLICATIONS

Lubaba N.C. et al., "Effect of Carbon Binders on the Development of Porosity in MgO-Graphite Composite Refractories," Br. Ceram Trans.Journal, British Ceramic Society, Stoke-on-Trent, GB, Sep.-Oct. 1988, vol. 87, No. 5, XP-000024434, pp. 164-167.

(Continued)

*Primary Examiner* — Melvin Mayes
*Assistant Examiner* — Guinever Gregorio
(74) *Attorney, Agent, or Firm* — Kratz, Quintos & Hanson, LLP

(57) ABSTRACT

A configuration in which particles of pitch 2 having a softening point in the range of 70 to 200° C. and a diameter equal to or smaller than 30 μm are held on the surfaces of particles of a refractory raw material 3 having a diameter equal to or smaller than 50 μm is employed. This pitch-containing refractory raw material 1 can be used with the pitch being in a fine-particle form without any aggregation even after the long-term storage. Using it as a part of a raw material formulation allows the fine particles of pitch to be uniformly dispersed during the mixing or kneading process. The resulting carbon-containing refractory has an excellent corrosion resistance. It also provides suppressed increase in the Young's modulus while maintaining the level of strength, thereby being excellent in thermal spalling resistance even with the carbon content ratio being low.

11 Claims, 2 Drawing Sheets

U.S. PATENT DOCUMENTS

| | | | | |
|---|---|---|---|---|
| 3,667,974 A | * | 6/1972 | Umeya et al. | 501/89 |
| 4,261,752 A | | 4/1981 | Danjyo et al. | 106/55 |
| 5,324,352 A | | 6/1994 | Hughes et al. | 106/284 |
| 5,736,030 A | * | 4/1998 | Tsuchitani et al. | 208/45 |

FOREIGN PATENT DOCUMENTS

| | | |
|---|---|---|
| GB | 1464349 | 2/1977 |
| GB | 2261674 A | 5/1993 |
| JP | 59-8672 | 1/1984 |
| JP | 59190307 A * | 10/1984 |
| JP | 1-275463 | 11/1989 |
| JP | 6-166574 | 6/1994 |
| JP | 6-321626 | 11/1994 |
| JP | 7-188565 | 7/1995 |
| JP | 9-132461 | 5/1997 |
| JP | 9-239503 | 9/1997 |
| JP | 9-255406 | 9/1997 |
| JP | 9-295859 | 11/1997 |
| JP | 9-309762 | 12/1997 |
| JP | 10-17357 | 1/1998 |
| JP | 10-95675 | 4/1998 |
| JP | 11-292614 | 10/1999 |
| JP | 2002-316865 | 10/2002 |
| JP | 2003-292384 | 10/2003 |

OTHER PUBLICATIONS

Aneziris C. G., et al., "Magnesia-Carbon Bricks—A High-Duty Refractory Material," Interceram, Refractories Manual, Jan. 1, 2003, XP-002479890, pp. 22-27.

Tarzisius Kuffa, et al. "The Influence of Carbon Materials on the Properties of MgO Refractories," Materiali in Tehnologije, Jun. 2005, vol. 39, No. 6, XP-002543156, pp. 211-213.

Supplementary European Search Report dated Sep. 8, 2009.

Japanese Office Action dated Jun. 19, 2009 with its English translation.

International Preliminary Report on Patentability dated Jan. 22, 2008.

A. Torigoe, et al.; "Improvement of Spalling Resistance of Low Carbon MgO-C Bricks;" *Refractories*; vol. 56; No. 6; 2004; pp. 278-281 (4 Sheets).

T. Suruga, et al.; "Spalling Resistance and Physical Behavior at High Temperature of MgO-C Refractories;" *Refractories*; vol. 56; vol. 10; 2004; pp. 498-502 (5 Sheets).

K. Jono, et al.; "Effect of Pitch Powder on Formation of Carbonbond in Castables;" *Refractories*; vol. 55; No. 11; 2003; pp. 530-531 (2 Sheets).

\* cited by examiner (a)

Primary particles of pitch (b)

Coating of pitch

CARBON-CONTAINING REFRACTORY, PRODUCTION METHOD THEREOF, AND PITCH-CONTAINING REFRACTORY RAW MATERIAL

TECHNICAL FIELD

The present invention relates to a carbon-containing refractory and a production method thereof, and relates especially to a carbon-containing refractory that exhibits an excellent thermal spalling resistance regardless of the content of carbon and a production method thereof.

BACKGROUND ART

A carbon-containing refractory containing a carbon material, such as graphite, pitch, carbon black and phenol resin, is excellent in thermal spalling resistance and slag resistance, and therefore is widely used in iron and steel, non-ferrous metal, cement, incinerators, waste-melting furnaces or the like. The wide variety of applications of such a refractory include inner wall bricks for converters, ladles, torpedo cars, vacuum degassing vessels or the like, monolithic refractories, continuous-casting nozzles such as submerged nozzles, and a repairing material such as spraying refractories and sintering.

However, the required quality level of steel products has been getting higher than a few years ago, as well as the required composition control level thereof has been getting stricter. This has shed light on the issue of liquid steel contamination, which is dissolution of carbon existing in a carbon-containing refractory in liquid steel (hereinafter, referred to as "carbon pickup"). In particular, magnesia-carbon bricks for converters, vacuum degassing vessels, ladles or the like originally contain graphite at content ratios of as high as 10 to 30 wt %, and users thereof are eager for reduced content ratios of graphite. To prevent the occurrences of the carbon pickup, reduction in the carbon content in a carbon-containing refractory is necessary.

Furthermore, thermal loss such as decreased temperature of liquid steel because of a high thermal conductivity of carbon, deformation of the surfaces of iron vessels, carbon monoxide emission associated with carbon combustion and other issues also necessitate the reduction in the carbon content in a carbon-containing refractory.

Reduction in the carbon content in a refractory involves the problem of lowered thermal spalling resistance of the refractory. The thermal spalling fracture resistance parameter R, which is an index of the thermal spalling resistance, is expressed as $R=S(1-\sigma)/E\alpha$, where S represents modulus of rupture, E represents Young's modulus (longitudinal elastic modulus), $\sigma$ represents Poisson's ratio and $\alpha$ represents linear expansion coefficient. Reducing the carbon content in a refractory results in particular increase in the linear expansion coefficient. Furthermore, it has been reported that a low carbon content would raise the frequency of contacts between aggregate particles formed of a refractory raw material such as magnesia and accordingly the aggregates exposed to high temperatures for a long time are excessively sintered, increasing the Young's modulus E of the refractory (see Non-patent Document 1). Therefore, the fracture resistance parameter R is generally reduced as the carbon content is reduced.

Considering the above situation, researchers have been utilizing a technique wherein pitch is added into a refractory, to suppress the increases in the linear expansion coefficient and the Young's modulus for reducing the carbon content in the resulting carbon-containing refractory (for example, see Patent Documents 1 to 3). Particles of heated pitch penetrate voids existing in the internal structure of bricks or between aggregate particles to fill such voids. This inhibits the contacts between and sintering of the aggregate particles. Furthermore, this matrix portion absorbs and buffers the expansion of the aggregate particles that occurs under high temperatures, thereby suppressing the linear expansion. This seems to result in an improved thermal spalling resistance (see Non-patent Document 2). In addition, pitch densities the internal structure of bricks, and thus has the effect of improving the strength of bricks by preventing the penetration of slag, hot metal and liquid steel.

Patent Document 1 discloses low-carbon MgO—C bricks containing low-softening-point pitch that has a softening point equal to or lower than 250° C. The document states that, since the softening point of pitch being 250° C. or lower, particles of the added pitch are molten and carbonized when heated, while penetrating small voids existing in the internal structure of bricks to form carbon bonds, and as a result, the hot strength and abrasion resistance at high temperatures of the bricks are improved.

[Patent Document 1]
Japanese Unexamined Patent Application Publication No. H9-309762
[Patent Document 2]
Japanese Unexamined Patent Application Publication No. H9-132461
[Patent Document 3]
Japanese Unexamined Patent Application Publication No. H6-321626
[Non-patent Document 1]
Atsushi Torigoe, Kazuhiro Inoue and Yasuhiro Hoshiyama, "Improvement of Spalling Resistance of Low-carbon MGO—C Bricks," *Refractories*, Vol. 56 [6], pp. 278-281, 2004.
[Non-patent Document 2]
Toshihiro Suruga, Eiichiro Hatae, Toshiyuki Hokii and Keisuke Asano, "Spalling Resistance and Hot Behavior of Magnesia-Carbon Bricks," *Refractories*, Vol. 56 [10], pp. 498-502, 2004.
[Non-patent Document 3]
Katsufumi Shirono, Eizo Maeda, Kazuyoshi Nakai and Toshihiro Yoshida, "Effect of Pitch on Carbon Bond Formation in Castables," *Refractories*, Vol. 55 [11], pp. 530-531, 2003.

DISCLOSURE OF INVENTION

Problems to be Solved by the Invention

However, there is a limitation on microparticulating the particles of low-softening-point pitch. In other words, the lower the softening point of pitch is, the lower viscosity thereof is. Also, reducing the diameter of pitch particles increases the specific surface area thereof, and the surface activity of the particles accordingly rises. This increases the cohesive properties of the particles and makes it extremely difficult to handle the particles even at room temperature, thereby causing a lot of troubles. Furthermore, microparticulated low-softening-point pitch would adhere, consolidate or aggregate with each other as primary particles so as to form aggregates, and thus is unable to exist separately. In the use of such low-softening-point pitch in the actual manufacturing process of a refractory in an industrial setting, therefore, the abovementioned issue of increased cohesive properties has to be addressed by limiting the minimum diameter of low-softening-point pitch particles to about 0.5 mm.

On the other hand, pitch heated in a refractory would be molten and absorbed into voids existing in the inner structure of bricks or between aggregate particles. As a result, other voids are formed in the places where the pitch particles were present (see Non-patent Document 3). The large diameter of pitch particles result in the large size of such voids, and the density of the matrix is accordingly reduced, causing the corrosion resistance to be lowered. So the use of low-softening-point pitch in the actual manufacturing process of a refractory in an industrial setting also has had the problem that melting damage is easily enhanced by the contact with slag or the like because of the large voids the pitch particles leave.

Patent Document 2 proposes a binder wherein particles of low-softening-point pitch having a softening point of 90 to 350° C., a content ratio of mesophase equal to or lower than 80%, and an average particle diameter equal to or smaller than 30 μm are uniformly dispersed in a liquid binder containing phenol resin. The document states that dispersing pitch particles in a liquid binder containing phenol resin in this way prevents the aggregation and segregation of pitch particles during the process of kneading the binder together with an aggregate material and addresses the issues of extreme expansion and contraction occurring in the heating process, removal of the binder from the aggregate material and residual carbon in the inner structure of the binder, thereby improving characteristics of the resulting refractory.

However, the addition of pitch into a liquid binder containing phenol resin results in an increased viscosity of the binder and difficulties in dispersing the binder particles in an aggregate material during then processes of mixing and kneading the binder and aggregate material with each other. A high viscosity of a binder would necessitate the use of a large amount of the binder for a sufficient kneading effect. This increases the amount of components that evaporate during the heating process and makes the resulting matrix relatively porous and poor in corrosion resistance.

This means that the necessity to suppress the increase in the binder viscosity limits the amount of pitch that can be used and allows the use of only a small amount of pitch. For example, in Patent Document 2, the maximum content ratio of pitch allowed in known magnesia-carbon bricks is only approximately 0.7 wt %.

Patent Document 3 discloses a method for producing MgO—C-based unburnt bricks using pitch-coated magnesia particles that are obtained by coating magnesia particles with pitch. When heated during its use, a refractory produced in this method acquire voids on the surface of the magnesia particles contained therein, because molten pitch is absorbed into the surrounding matrix. Furthermore, the inner wall of each void has graphite of low crystallinity. These voids and graphite existing on the inner wall thereof prevent cracks generated by thermal spalling from running, and this protection effect stops the cracks growing into large ones that may cause the bricks to drop. In this way, the thermal spalling resistance of bricks is improved.

It is true that the voids formed around the magnesia particles are effective in improving thermal spalling resistance, but the resulting bricks are poor in terms of corrosion resistance. This is because of the presumption that such magnesia particles can not sufficiently attach to the surrounding components because of the voids formed on the surface thereof and then molten slag penetrates these voids, making the magnesia particles more likely to be detached from the surrounding components.

Considering the above situations, the objective of the present invention is to enable uniformly dispersing fine particles of low-softening-point pitch in a refractory even in the actual manufacturing process thereof in an industrial setting, and to provide a carbon-containing refractory that can achieve high corrosion and thermal spalling resistances compared to those of known refractories, a production method thereof, and a pitch-containing refractory raw material for producing such a carbon-containing refractory.

Means for Solving the Problems

The pitch-containing refractory raw material according to the present invention is a pitch-containing refractory raw material that is formed of a mixture containing primary particles of pitch having a softening point being in the range of 70 to 200° C. and carrier particles, wherein the primary particles of pitch are dispersed in the mixture in the state of secondary particles, which are held on the surfaces of the carrier particles.

"Primary particle" means the minimum unit of particles that constitute powder or aggregates and exist without breaking intermolecular bonds. "Secondary particle" means a particle formed by the aggregation of several primary particles.

When softened, pitch having a low softening point exhibits a low viscosity and a high fluidity, and thus likely to penetrate small voids existing in a refractory and has a significant effect of improving the strength of the refractory as a binder. It also has considerable effects of interfering with contacts between the raw material particles, retarding sintering of the raw material particles and suppressing the increase in the Young's modulus. Therefore, the use of pitch having a softening point being in the range of 70 to 200° C. allows the pitch to function as an effective binder and retards sintering of the raw material particles.

In the present invention, the fine particles of pitch are held on the surfaces of the carrier particles for the purpose of addressing the issue of increased cohesive properties found in low-softening-point pitch particles. In this pitch-containing refractory raw material, as seen in FIG. 1 (a), primary particles of pitch 2, which are fine particles of pitch, are held on the surfaces of the carrier particles 3, and the secondary particles 1 formed thereby can exist in a steady state. This prevents adhesion and aggregation of the pitch particles associated with microparticulation.

The secondary particles 1 are the carrier particles 3 holding the primary particles of pitch 2 on their surfaces (see FIG. 1 (a)), and thus are different from the pitch-coated magnesia particles according to Patent Document 3 (see FIG. 1 (b)) formed by coating the surfaces of the carrier particles 3 with liquid pitch. The primary particles of pitch 2 attached in the state of fine particles in this way prevents the carrier particles 3 from being completely detached from the matrix even when heated pitch leaves voids. Also, the pitch particles are fine particles and the size of voids that the heated pitch leaves is accordingly small, so that the voids are unlikely to be in communication with one another. Therefore, molten slag would be unlikely to penetrate the voids and thus dropout of the carrier particles 3 would be avoided.

Furthermore, the primary particles of pitch 2 held on the surfaces of the carrier particles 3 maintain the stable dispersion state thereof. This prevents the aggregation and solidification of the primary particles of pitch 2 even for long-term storage, always keeping them in the fine particle state.

Moreover, the use of this pitch-containing refractory raw material containing these secondary particles 1 in the production process of a known refractory as a part of the raw material formulation leads to uniform dispersion of low-softening-point pitch in the extremely fine particle state in the refractory without any aggregations. It can therefore substitute for known pitch in any kind of refractories and can be used in a wide variety of applications including refractories that usually contain no pitch. For example, refractory bricks obtained by kneading this pitch-containing refractory raw material together with other refractory raw materials can be heat-treated after being molded. Also, monolithic refractories containing such a pitch-containing refractory raw material and other refractory raw materials provide powder products such as castables.

Pitch that can be used in the present invention includes coal-pitch, petroleum-pitch and synthesized pitch whose softening point is in the range of 70 to 200° C. When the softening point is equal to or lower than 70° C., the heat of friction generated during the kneading process softens the pitch and raises the viscosity of the binder, causing difficulties in kneading the materials, and this may result in the formation of large aggregates of the pitch particles. Also, the high content of components that evaporate during the use at high temperatures makes it impossible to ensure an adequate ratio of remaining carbon. On the other hand, when the softening point is equal to or lower than 200° C., the pitch softened during heat-treatment has a high viscosity and thus is unlikely to penetrate small voids existing in the matrix. Consequently, to facilitate handling of the pitch particles and penetration of pitch into the small voids and to ensure an adequate ratio of remaining carbon even after heat-treatment, the softening point of pitch used in the present invention is particularly preferably in the range of 100 to 150° C. However, pitch having a softening point equal to or higher than 200° C. may also be used without impairing the features of the pitch-containing refractory raw material according to the present invention.

The carrier particles that hold the abovementioned pitch particles include any kinds of refractory raw materials that are often used as the raw materials of a refractory, but do not include pitch. The examples thereof include metal oxides such as magnesia, alumina, silica and zirconia, metal carbides such as silicon carbide, metal nitride such as silicon nitride, carbon materials such as graphite, metals such as aluminum, and borides such as zirconium boride and mixtures thereof.

Meanwhile, the pitch-containing refractory raw material according to the present invention is a pitch-containing refractory raw material that is formed of a mixture containing primary particles of pitch having a softening point in the range of 70 to 200° C. and carrier particles, wherein mixed particles are made by attaching the primary particles of pitch to the carrier particles so that the average diameter of the mixed particles is equal to or smaller than 50 μm.

In a pitch-containing refractory raw material, the smaller the particle diameter is, the more uniformly the pitch particles are dispersed in the matrix of the resulting refractory, and therefore the average particle diameter is preferably equal to or smaller than 50 μm. When the average particle diameter is larger than 50 μm, the uniformity of pitch dispersion is poor, and thus neither intended spalling resistance nor strength is obtained. The "average particle diameter" described above means the median diameter of the mixed particles formed by attaching the primary particles of pitch to the carrier particles. In other words, the average particle diameter is the particle size of the pitch-containing refractory raw material at a weight content ratio of 50 wt % derived from the plot of particle size versus accumulated weight. In addition, the particle size can be measured using known measurement apparatuses such as a sieve and a laser diffraction particle size analyzer.

Furthermore, in the present invention, the average diameter of the primary particles of pitch held on the surfaces of the carrier particles may be equal to or smaller than 30 μm.

This prevents the voids left after heat-treatment of the pitch from being in communication with each other and makes the molten slag unlikely to penetrate the voids. An average particle diameter being larger than 30 μm would be greater than the diameter of the voids the heated pitch leaves, allowing the infiltration of molten slag, which often impairs the corrosion resistance of the resulting refractory. The average particle diameter is more preferably in the range of 5 to 20 μm. When the average particle diameter is smaller than 5 μm, insufficient absorption of thermal stress results in the absence of thermal spalling resistance. On the other hand, when the average particle diameter is larger than 20 μm, large voids formed after disappearance of the volatile components bring about poor corrosion resistance.

Also, in the present invention, the content ratio of above-mentioned pitch may be in the range of 10 to 50 wt %.

When the content ratio of pitch is lower than 10 wt %, pitch tends to have little effect of reducing the thermal stress. On the other hand, when the content ratio of pitch is higher than 50 wt %, secondary particles attach to, fuse into or aggregate with each other through the contacts via the pitch to form clusters.

The carbon-containing refractory according to the present invention contains fine particles of pitch that have a softening point being in the range of 70 to 200° C. and an average diameter equal to or smaller than 30 pm and exist in a dispersed state therein.

A carbon-containing refractory in such a composition has a corrosion resistance much higher than that of a known pitch-based refractory. Also, it turned out to be capable of suppressing the increase in the Young's modulus while maintaining the level of strength, thus having a positive and excellent effect in improving thermal spalling resistance.

The inventors consider the reason for these findings to be the uniform dispersion of fine particles of pitch having a softening point being in the range of 70 to 200° C. and an average particle diameter equal to or smaller than 30 μm in a refractory. In other words, the volatile components of the fine particles of pitch contained in a refractory evaporate during heat-treatment but the remaining nonvolatile components are molten at the same time and then penetrate small voids existing between particles of the raw material in the matrix (see Non-patent Document 3). After that, the pitch particles heated in the voids between raw material particles suppress sintering of the raw material particles while forming bonds between the raw material particles. Because of the low softening point of the pitch and the particle diameter much smaller than that of particles of known pitch, these bonds can penetrate small voids existing between fine particles of the raw material constituting the matrix so as to be dispersed uniformly. As a result, a network of chains of pitch bonds is formed in the matrix. These chains of pitch bonds provide a structure having an extremely low elasticity and a high strength compared with those provided by the known structure constituted solely of pitch particles.

On the other hand, the spaces where the pitch particles were present become voids. In the present invention, therefore, the diameter of pitch particles existing in the refractory is much smaller than that of known refractories. In other words, voids are small and uniformly distributed. This significantly suppresses the decrease in corrosion resistance that has been a problem in known low-softening-point pitch. It also can be considered that such voids that are smaller and more uniformly dispersed than those in known refractories reduce elasticity (Young's modulus). The inventors thus found that limiting the average diameter of pitch particles dispersed in a refractory to be equal to or smaller than 30 μm results in the formation of a carbon-containing refractory with excellent thermal spalling resistance and corrosion resistance even if the quantity of carbon contained therein is small.

For the reasons described above, the smaller the average diameter of pitch fine particles contained in the carbon-containing refractory is the better, and the average particle diameter is preferably equal to or smaller than 30 μm, more preferably in the range of 0.1 to 20 μm for achieving a low elasticity of the resulting refractory, and even more preferably in the range of 0.1 to 10 μm for achieving a higher strength thereof. It should be noted that the reason why the average particle diameter is equal to or higher than 0.1μ is the fact that an excessively small particle diameter causes the manufacturing process to be cumbersome and costly. Meanwhile, the softening point of such pitch is preferably in the range of 100 to 150° C. A softening point lower than 100° C. would allow the pitch particles to aggregate easily during the manufacturing process, whereas one higher than 150° C. would inhibit molten pitch from penetrating small voids existing in the matrix.

In addition, the carbon-containing refractory according to the present invention can be applied as both amorphous and formed refractories without problems. The carbon-containing refractory in which the content ratio of carbon is equal to or smaller than 15 wt % is especially effective. In this case, the addition of a pitch-containing refractory raw material helps to reduce the content of carbon, in particular, graphite. Magnesia-carbon bricks and alumina-carbon bricks significantly benefit from the application of such a carbon-containing refractory.

When applying such a carbon-containing refractory to magnesia-carbon bricks, the pitch-containing refractory raw material is added into those having the formulation of 1 to 20 wt % of graphite, 50 to 80 wt % of magnesia, 1 to 20 wt % of one or more kinds selected from the group including spinel, zirconia, alumina, silica, carbide, metal and carbon so that the content ratio of the refractory raw material based on the original weight of the formulation is in the range of 3 to 30 wt %. This significantly reduces the content of graphite.

On the other hand, the application of such a carbon-containing refractory to alumina-carbon bricks would improve the strength and lower the elasticity of plates, nozzles and other components of sliding nozzle devices, resulting in the significantly enhanced durability of such devices. In the case of alumina-carbon bricks for submerged nozzles and long nozzles, the great reduction in the content of graphite markedly improves the durability of such nozzles.

Meanwhile, in the carbon-containing refractory according to the present invention, the overall content ratio of carbon may be equal to or smaller than 15 wt % (but may not be zero).

This provides the resulting refractory with an excellent thermal spalling resistance and low thermal conductivity, and therefore, in vessels for molten metal formed of such a refractory, the thermal loss of molten steel is suppressed as well as the carbon pickup.

The "content ratio of carbon" described above means the fixed content ratio of carbon contained in a heated refractory, which takes into account not only carbon derived from carbon raw materials but also carbon derived from an organic binder.

Furthermore, in the present invention, the abovementioned carbon-containing refractory may be calcined at temperatures in the range of 500 to 1200° C.

Calcination at temperatures within the range described above carbonizes pitch, thereby improving the strength and thermal spalling resistance thereof.

The production method of the carbon-containing refractory according to the present invention includes a first step wherein primary particles of pitch having a softening point in the range of 70 to 200° C. and an average particle diameter equal to or smaller than 30 μm are held on the surfaces of carrier particles to form secondary particles, and a second step wherein the secondary particles are added into a refractory raw material formulation so that the content ratio thereof is in the range of 3 to 30 wt % of the total weight of the other components and then uniformly mixed to form a carbon-containing refractory.

Preparing a pitch-containing refractory raw material containing pitch in which low-softening-point pitch particles are held by the carrier particles in the first step and mixing the pitch-containing refractory raw material with a refractory raw material formulation in the second step result in the uniform dispersion of the fine particles of low-softening-point pitch in the refractory raw material formulation. The obtained refractory raw material formulation containing the pitch-containing refractory raw material is kneaded, molded and then heat-treated to produce the carbon-containing refractory. In this production method, the fine particles of low-softening-point pitch are uniformly dispersed in the matrix of the refractory and function as effective binders. This makes it possible to ensure a high thermal spalling resistance regardless of the content of carbon, as described above.

Furthermore, in the second step, it is preferable that an organic polymer resin such as phenol resin is also mixed as a binder. This is because carbon bonds formed of such an organic polymer resin is reinforced by other carbon bonds formed of pitch, improving the strength and lowering the elasticity of the resulting refractory.

There is no particular limitation on the method of preparing the pitch-containing refractory raw material in the first step. Examples thereof include a method in which pitch particles (primary particles) and carrier particles are mixed with each other. More specifically, a method in which pitch is pulverized into fine particles having an average diameter equal to or smaller than 30 μm, and immediately after that, the pitch particles are mixed with carrier particles whose average diameter is similar to or slightly greater than that of the pitch particles using a V-shaped mixer so as to the pitch particles are held by the carrier particles, is possible. In this method, the content ratio of pitch added is set to be the same as that supposed to be achieved in the resulting pitch-containing refractory raw material. Furthermore, for effective prevention of the primary particles of the pitch from aggregation, the pitch is cooled before pulverization, and the pulverized pitch is immediately mixed with the carrier particles at temperatures at which the pitch particles do not aggregate. In addition, once the primary particles of the pitch are held by the carrier particles and form the secondary particles, they are stable and thus the primary particles of the pitch hardly aggregate even if they are stored at room temperature.

Meanwhile, in the present invention, the abovementioned secondary particles and refractory raw material formulation may contain a carbon material, and the overall carbon content ratio of the resulting carbon-containing refractory may be equal to or smaller than 15 wt % (but may not be zero).

Also, a possible configuration of the present invention may include a third step wherein the carbon-containing refractory produced in the second step is heat-treated at temperatures in the range of 500 to 1200° C.

The reasons why the heat treatment temperature is in the range of 500 to 1200° C. are that the heat treatment at temperatures lower than 500° C. results in the formation of insufficient carbon bonds due to remaining volatile components such as pitch, and that the heat treatment at temperatures higher than 1200° C. results in the enhancement of elasticity since oxides rather than carbon are involved in the sintering.

Advantages

As described above, in the pitch-containing refractory raw material according to the present invention, low-softening-point pitch particles exist while being held on the surfaces of the carrier particles and thus exist as very fine and stable particles without aggregation. Therefore, the carbon-containing refractory formed of this pitch-containing refractory raw material contains the fine particles of low-softening-point pitch uniformly dispersed in the matrix thereof, where the pitch particles function as effective binders. This significantly raises corrosion resistance, strength and thermal spalling resistance, thereby markedly improving durability.

Also, in the carbon-containing refractory according to the present invention, fine particles of low-softening-point pitch are almost uniformly dispersed and thus function as effective binders. This also significantly raises corrosion resistance, strength and thermal spalling resistance, thereby markedly improving durability. Furthermore, when applied to a known carbon-containing refractory, the present invention reduces the content ratio of carbon such as graphite, thereby improving the oxidation resistance of the resulting refractory. When used in vessels for molten metal, it also prevents carbon from being picked up into molten steel, thereby improving the thermal insulating properties thereof.

Moreover, the production method of a carbon-containing refractory according to the present invention enables the production of refractory raw material formulations and compositions thereof in which fine particles of low-softening-point pitch exist without aggregation. Therefore, a refractory produced in the method according to the present invention exhibits significantly high corrosion resistance, strength and thermal spalling resistance and thus is remarkably durable, when compared with those achieved by the use of known low-softening-point pitch.

REFERENCE NUMERALS

1 Secondary particles
2 Primary particles of pitch
2' Secondary particles of pitch
3 Carrier particles

BEST MODE FOR CARRYING OUT THE INVENTION

The best mode for carrying out the present invention is described below.

The pitch-containing refractory raw material mentioned in the embodiment described below is used for producing a carbon-containing refractory for making molten metal vessels for iron and steel industry. In this embodiment, the carbon-containing refractory is produced by adding a pitch-containing refractory raw material containing secondary particles, in which fine particles of pitch (primary particles of pitch) are held on the surfaces of carrier particles, into a refractory raw material formulation, mixing and kneading them, and then subjecting them to molding, drying and heat-treatment processes.

The refractory raw material formulation mentioned above means a formulation containing predetermined content ratios of refractory raw materials that have been commonly used as raw materials of refractories. Examples of such refractory raw materials include metal oxides such as magnesia, alumina, silica and zirconia, metal carbides such as silicon carbide, metal nitrides such as silicon nitride, carbon materials such as pitch, tar, carbon black and graphite, metals such as aluminum, and borides such as zirconium boride, and they may be used separately or in combination of two or more kinds thereof. Some kinds of refractory may contain a known dispersing agent, binding agent, quick setting agent, hardening agent or the like. For example, a castable for inner coatings of molten metal vessels or other containers is produced by adding a pitch-containing refractory raw material into such a refractory raw material formulation, adding a predetermined amount of water and kneading them using a mixer, flowing the mixture into a die for molding, and then subjecting the resulting composition to heat-treatment. Also, refractory bricks are produced by adding a pitch-containing refractory raw material into such a refractory raw material formulation, adding a liquid binder and kneading them, and then subjecting the resulting mixture to pressure molding and heat-treatment.

Figure 1:
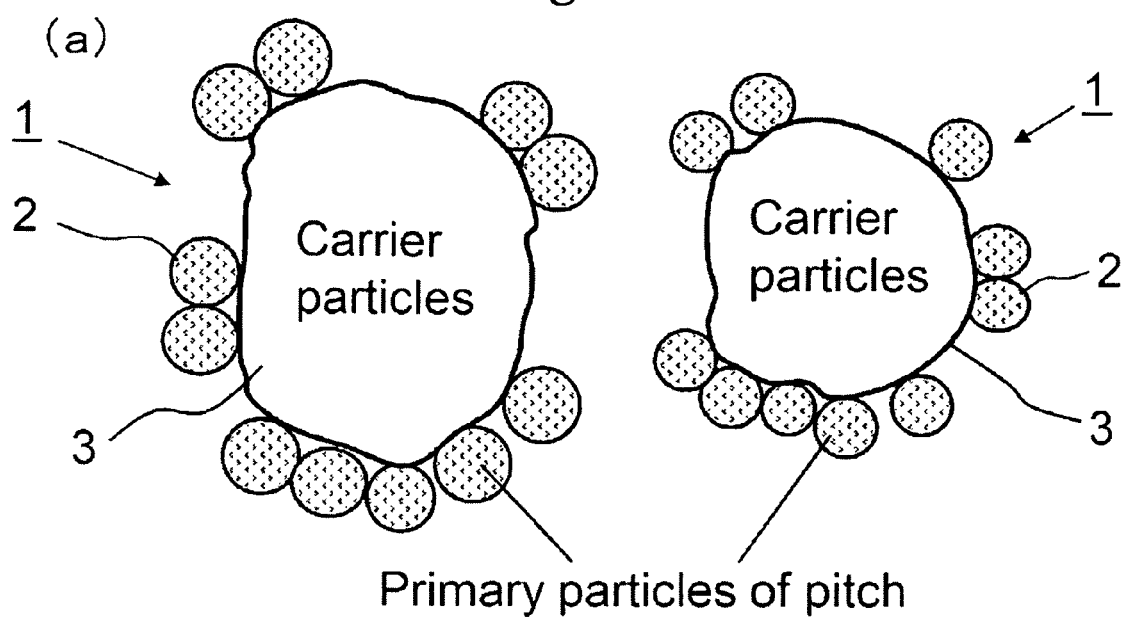
FIG. 1 includes schematic diagrams of the secondary particles of the pitch-containing refractory raw material according to the present invention (a) and the pitch-coated magnesia particles described in Patent Document 3 (b)
Figure 1:
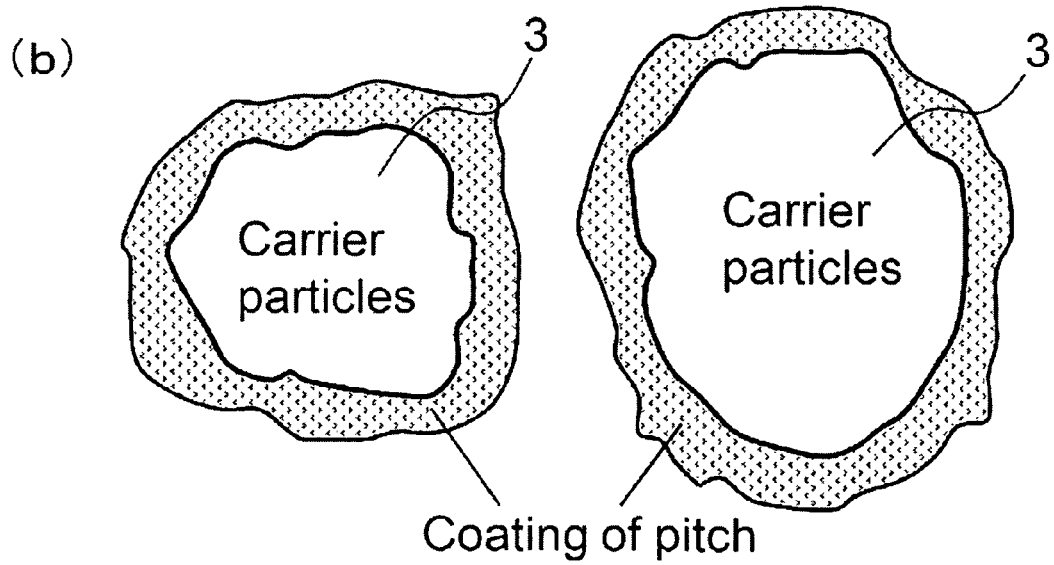
Figure 2:
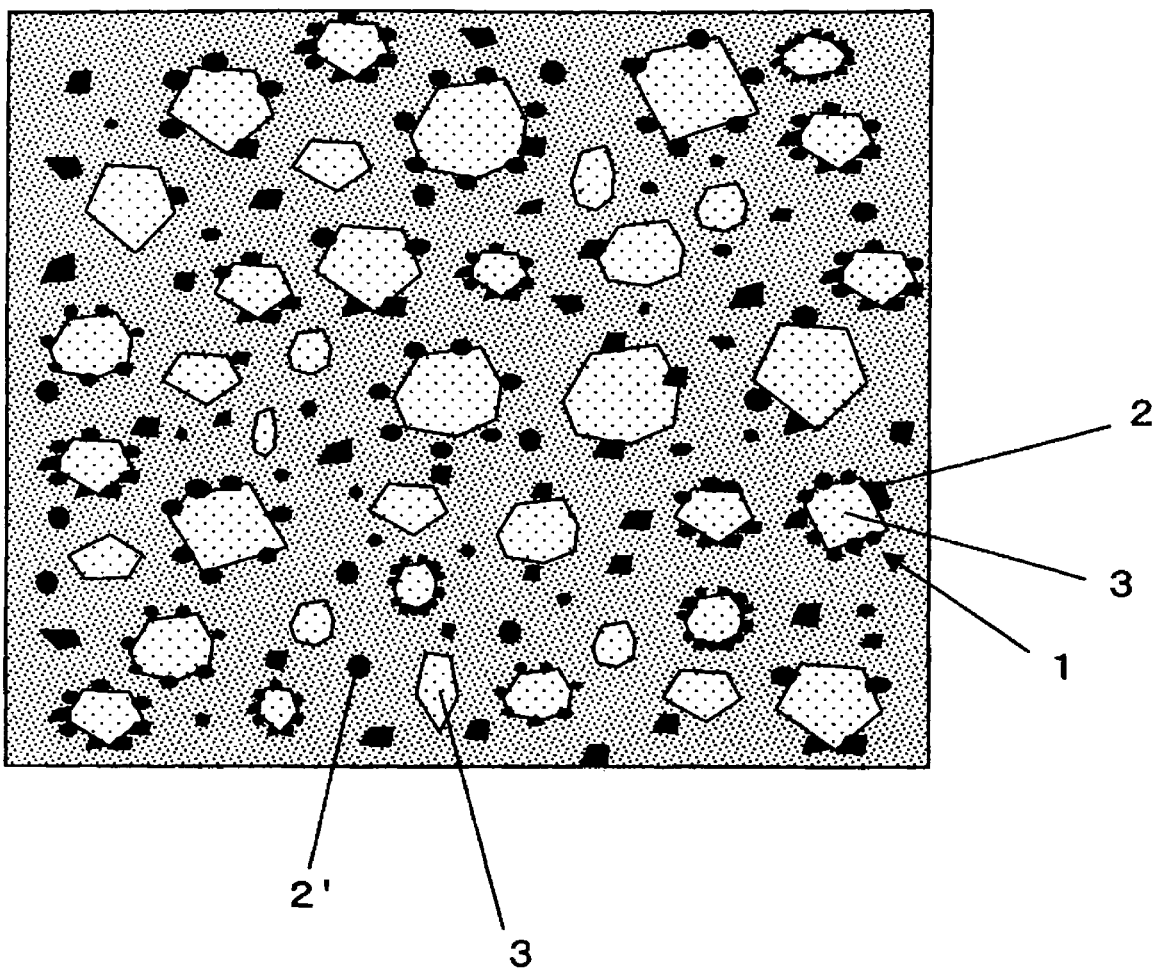
FIG. 2 is a schematic diagram of the pitch-containing refractory raw material.

In the present invention, the pitch-containing refractory raw material includes the mixture of secondary particles 1, in which primary particles of pitch 2 are held on the surfaces of carrier particles 3 as shown in FIG. 1 (a), or the mixture containing small amounts of primary particles of pitch that are not held by the carrier particles 3, the secondary particles of pitch 2' and carrier particles 3 that are not holding the primary particles of pitch 2 as the balance as shown in FIG. 2. In FIG. 2, the particles other than the secondary particles are raw materials or by-products left after the holding process, and thus are difficult to be isolated. These pitch particles, which are not held by the carrier particles, may be directly used without aggregation. In the mixture shown in FIG. 2, it is preferable that the content ratio of the secondary particles 1 in the pitch-containing refractory raw material is equal to or larger than 70 wt %.

Then, the content ratio of pitch in the pitch-containing refractory raw material takes into account small amounts of the primary particles of pitch that are not held by the carrier particles and the secondary particles of pitch 2' shown in FIG. 2. Meanwhile, in the present invention, the status of the mixture is represented by a typical status of the entire mixture. The inventers consider that measurements obtained using the mixture of 20 or more particles sampled from 1000 g or more of a pitch-containing refractory raw material are sufficient to represent such a typical status. For example, the average diameter of particles held by the carrier particles is a microscopically determined average diameter of 20 or more of such particles.

There is no specific method for producing such a pitch-containing refractory raw material, and examples of such a method include simply mixing pitch particles and carrier particles. More specifically, such a pitch-containing refractory raw material can be obtained by pulverizing pitch into fine particles and immediately mixing them with carrier particles using a V-shaped mixer. This method allows the fine particles of pitch to be uniformly held on the surfaces of the carrier particles, thereby preventing the fine particles of pitch from aggregating into clusters. In addition, in a pitch-containing refractory raw material obtained using this production method, the diameters of secondary particles and pitch particles held by the carrier particles can be controlled by the use of pitch particles and/or carrier particles having different diameters or the modification of mixing time, temperature and/or other conditions. The content ratio of pitch in the resulting pitch-containing refractory raw material can also be controlled by changing the weight proportion of pitch particles to carrier particles added. As needed, particles having larger diameters may be removed from the obtained mixture using a sieve so as to control the particle diameter and to achieve a necessary average particle diameter.

When such a pitch-containing refractory raw material is mixed with a refractory raw material formulation, the content ratio of the pitch-containing refractory raw material in 100 parts by weight of the refractory raw material formulation is in the range of 3 to 30 parts by weight. The content ratio lower than 3 parts by weight would result in insufficient properties of pitch, whereas the content ratio higher than 30 parts by weight would deteriorate the strength. The content ratio of pitch is preferably in the range of 0.8 to 10 wt % based on the weight of the resulting refractory.

Monolithic refractories or refractory bricks can be produced by adding a predetermined amount of such a pitch-containing refractory raw material into a refractory raw material formulation. For example, powdery monolithic refractories can be obtained by adding a predetermined amount of a pitch-containing refractory raw material into a refractory raw material during the weighing process thereof, and then mixing them. Thus-obtained monolithic refractories are sprayed onto or flowed into the subject in construction settings so as to provide a structure in which fine particles of pitch are uniformly dispersed. On the other hand, refractory bricks in which fine particles of pitch are uniformly dispersed are produced by adding a predetermined amount of a pitch-containing refractory raw material into a refractory raw material formulation, adding a liquid binder and kneading them, and then subjecting the resulting mixture to molding and heat-treatment processes.

In addition, the carbon-containing refractory according to this embodiment may be a burnt refractory or an unburnt refractory. The heat-treatment process may be carried out at any temperature without particular limitation. For example, to produce an unburnt refractory, a composition of a carbon-containing refractory raw material is heated for 3 to 24 hours at temperatures being in the range of 150 to 250° C. On the other hand, to produce a high-temperature-burnt refractory, a composition of a carbon-containing refractory raw material is heated for 2 to 10 hours at temperatures being in the range of 500 to 1200° C.

Thus-obtained carbon-containing refractory has a structure in which fine particles of pitch are well mixed and uniformly dispersed in the matrix. The average diameter of such dispersed pitch particles is substantially the same as that of the pitch particles contained in the pitch-containing refractory raw material used. Since heated particles of pitch are softened and penetrate into voids existing between the particles of refractory raw material, however, the heat-treated refractory contains the pitch particles in a uniformly dispersed state in its structure. A microscopic observation of the structure of such a heat-treated refractory would find few round or roughly round voids left after the aggregation of pitch particles, which are often seen in a known refractory. On the other hand, in a known refractory produced using fine particles of low-softening-point pitch, a microscopic observation of the structure of the resulting refractory would suggest the presence of many round or roughly round voids caused by the aggregation of pitch particles that occurs during the kneading process.

Finally, specific examples and comparative examples of the present invention are described below in order to make a detailed explanation of the carbon-containing refractory according to the present invention.

Example 1

Table 1 shows the composition ratios of a pitch-containing refractory raw material used in the examples and comparative examples described below and the average particle diameters of the resulting pitch-containing refractory raw materials and the pitch particles held by the carrier particles. Table 2 shows the composition ratios of magnesia-carbon bricks produced using the pitch-containing refractory raw materials listed in Table 1 and the test results for these bricks. As for Table 1, pitch was pulverized into particles having the average diameters listed in Table 1, and immediately after that, the particles were mixed with magnesia material according to the content ratios (wt %) shown in Table 1. The observations of the obtained mixtures demonstrated that the mixtures consisted of secondary particles 1, in which primary particles of pitch 2 were held by the magnesia material particles (carrier particles) 3, secondary particles of pitch 2' and the carrier particles 3, as shown in FIG. 2. In addition, a laser diffraction particle size analyzer was used to determine the average particle diameter of each pitch-containing refractory raw material used. The average particle diameter described above means the median diameter. The obtained pitch-containing refractory raw materials were sampled and microscopically observed, and every refractory raw material contained the secondary particles 1 at a content ratio equal to or higher than 95%. The pitch particles held by the carrier particles were also evaluated at the same time for the average diameter using a microscope.

The individual examples were obtained by kneading the formulations listed in Table 2 (in wt %), pressure-molding the kneaded mixtures into cylinders using a friction press, and then heating the products at 250° C. for 24 hours. Thus-obtained test refractories were evaluated for modulus of rupture, thermal spalling resistance and corrosion resistance. The fracture resistance parameters R (R=S(1−σ)/Eα, where S represents modulus of rupture, σ represents Poisson's ratio, E represents Young's modulus and α represents linear expansion coefficient) were calculated from the measured values of the modulus of rupture, Young's modulus and linear expansion coefficient. The modulus of rupture was measured according to JIS-R2213, the Young's modulus (modulus of elasticity) was measured using an ultrasound approach, and the linear expansion coefficient was determined from the slope of expansion curves created by plotting hot linear expansion ratios according to JIS-R2207. The thermal spalling resistance was determined by visually measuring the size of cracks generated after repeating 10 cycles of the step of immersing the examples in hot metal at 1500° C. for 3 minutes and then cooling them at room temperature for 15 minutes. To determine the corrosion resistance, a rotary corrosion test was used, where the examples were tested with converter slag at 1700° C. for 5 hours. The dimensions of melting damages were measured and expressed as index with the melting damage dimension of Comparative Example 1 being 100.

TABLE 1

|  |  | A | B | C |
|---|---|---|---|---|
| Raw material used (wt %) | Magnesia (average particle diameter 18 μm) | 85 | 65 | 85 |
|  | Pitch a (average particle diameter 7 μm; softening point 150° C.) | 15 | 35 |  |
|  | Pitch b (average particle diameter 20 μm; softening point 400° C.) |  |  | 15 |
| Average diameter of pitch-containing refractory raw material particles (μm) |  | 35 | 41 | 55 |
| Average diameter of pitch particles held by the carrier particles (μm) |  | <15 | <15 | >30 |

In the measurement of the modulus of rupture, Young's modulus and thermal spalling resistance, each of the test refractories was cut into a predetermined shape, embedded in coke breeze, burnt at 1400° C. for 3 hours and then tested. An RH degassing furnace was used in a practical test, where the examples were used as inner lateral walls thereof.

As is obvious in Table 2, all of the refractories obtained by implementing the examples according to the present invention acquired an enhanced fracture resistance parameter and a significantly improved thermal spalling resistance, as well as the corrosion resistance that was better than those of Comparative Examples 2 and 3 corresponding to known refractories. As a result, in the practical test, Example 1 exhibited as approximately 1.2 times longer lifetime as that of Comparative Example 3, a known refractory.

Comparative Example 1, which was formed using a pitch-containing refractory raw material where pitch particles having a softening point that deviated from the range specified according to the present invention were held by carrier particles, had a low strength possibly due to insufficient softening of the pitch achieved during the heating process. Comparative Examples 2 and 3 were formed using low-softening-point pitch and high-softening-point pitch particles, respectively, while omitting the holding process. They exhibited corrosion resistances and thermal spalling resistances that were much lower than those of Examples.

TABLE 2

|  | Examples according to the present invention | | | | Comparative Examples | | |
|---|---|---|---|---|---|---|---|
|  | 1 | 2 | 3 | 4 | 1 | 2 | 3 |
| Magnesia | 92 | 89 | 92 | 91 | 92 | 96 | 96 |
| Scale-like graphite | 3 | 1 | 5 | 2 | 3 | 3 | 3 |
| Pitch-containing refractory raw material A | 5 | 10 |  |  |  |  |  |
| Pitch-containing refractory raw material B |  |  | 3 | 7 |  |  |  |
| Pitch-containing refractory raw material C |  |  |  |  | 5 |  |  |
| Pitch a |  |  |  |  |  | 1 |  |
| Pitch b |  |  |  |  |  |  | 1 |
| Boron carbide | (1) |  |  | (1) |  | (1) |  |
| Metal aluminum | (2) | (1) | (2) |  | (2) | (2) |  |
| Al—Mg alloy |  | (1) |  | (2) |  |  | (2) |
| Phenol resin | (2) |  | (2) | (2) | (2) | (2) | (2) |
| Furan resin |  | (2) |  |  |  |  |  |
| Carbon content ratio (wt %) | 3.9 | 2.4 | 6.1 | 3.9 | 4.1 | 4.1 | 4.3 |
| Modulus of rupture (MPa) | 25 | 20 | 18 | 15 | 25 | 24 | 28 |

TABLE 2-continued

|  | Examples according to the present invention | | | | Comparative Examples | | |
|---|---|---|---|---|---|---|---|
|  | 1 | 2 | 3 | 4 | 1 | 2 | 3 |
| Corrosion resistance* | 100 | 98 | 95 | 90 | 100 | 130 | 130 |
| Thermal spalling resistance** | None | None | None | None | Medium | Medium | Medium |
| Fracture resistance parameter (R)*** | 1 | 1.1 | 1.2 | 1.2 | 0.8 | 0.8 | 0.8 |

The values surrounded by parentheses indicate the ratio relative to the weight of the all other components.
*The smaller the corrosive resistance is the better.
**"None" or "Medium" indicates the degree of crack generation.
***The fracture resistance parameters are indices with the value of Example 1 being 1, and the larger the value is the better.

Example 2

Table 3 shows the composition ratios of a pitch-containing refractory raw material used in the examples and comparative examples described below and the average particle diameters of the resulting pitch-containing refractory raw materials and the pitch particles held by the carrier particles. Table 4 shows the composition ratios of alumina-carbon bricks produced using the pitch-containing refractory raw materials listed in Table 3 and the test results for these bricks. As for Table 3, pitch was pulverized into particles having the average diameters listed in Table 3, and immediately after that, the particles were mixed with alumina material using a V-shaped mixer so as to provide pitch-containing refractory raw materials, according to the content ratios (wt %) shown in Table 3. The microscopic observations of the obtained pitch-containing refractory raw materials demonstrated that the refractory raw materials consisted of secondary particles 1, in which primary particles of pitch 2 were held by the alumina material particles (carrier particles) 3, secondary particles of pitch 2' and the carrier particles 3, as shown in FIG. 2. The obtained pitch-containing refractory raw, materials were sampled and microscopically observed, and every refractory raw material contained the secondary particles 1 at a content ratio equal to or higher than 95%. The pitch particles held by the carrier particles were also evaluated at the same time for the average diameter using a microscope.

The individual examples were obtained by kneading the formulations listed in Table 4, pressure-molding the kneaded mixtures into cylinders using a friction press, heating the products at 250° C. for 24 hours, and then subjecting them to the heat-treatment carried out in reductive atmosphere at temperatures of 1000 to 1100° C.

Thus-obtained test refractories were evaluated for the modulus of rupture, thermal spalling resistance and corrosion resistance in the same manner as Example 1.

TABLE 3

|  |  | D | E | F |
|---|---|---|---|---|
| Raw material used (wt %) | Alumina (average particle diameter 17 (μm) | 80 | 60 | 80 |
|  | Pitch a (average particle diameter 5 (μm; softening point 150° C.) | 20 | 40 |  |
|  | Pitch b (average particle diameter 20 μm; softening point 400° C.) |  |  | 20 |

TABLE 3-continued

|  | D | E | F |
|---|---|---|---|
| Average diameter of pitch-containing refractory raw material particles (μm) | 33 | 42 | 59 |
| Average diameter of pitch particles held by the carrier particles (μm) | <15 | <15 | >30 |

As is obvious in Table 4, all of the refractories obtained by implementing the examples according to the present invention acquired a significantly improved thermal spalling resistance, as well as the corrosion resistance that was equal to or better than those of the comparative examples corresponding to known refractories. As a result, in a practical test in which the test refractories were used as plate bricks for a sliding nozzle apparatus, Example 5 exhibited as approximately 1.5 times longer lifetime as that of Comparative Example 6, known plate bricks.

Comparative Example 4, which was formed using a pitch-containing refractory raw material where pitch particles having a softening point higher than the upper limit thereof specified according to the present invention were held by carrier particles, had a low strength possibly due to insufficient softening of the pitch achieved during the heating process. Comparative Examples 5 and 6 were formed using low-softening-point pitch and high-softening-point pitch particles, respectively, while omitting the holding process. They exhibited corrosion resistances and thermal spalling resistances that were lower than those of Examples.

TABLE 4

|  | Examples according to the present invention | | | | Comparative Examples | | |
|---|---|---|---|---|---|---|---|
|  | 5 | 6 | 7 | 8 | 4 | 5 | 6 |
| Alumina | 89 | 82 | 94 | 92 | 89 | 96 | 96 |
| Pitch coke | 3 | 3 | 3 | 3 | 3 | 3 | 3 |
| Pitch-containing refractory raw material D | 8 | 15 | | | | | |
| Pitch-containing refractory raw material E | | | 3 | 5 | | | |
| Pitch-containing refractory raw material F | | | | | 8 | | |
| Pitch a | | | | | | 1 | |
| Pitch b | | | | | | | 1 |
| Metal silicon | (2) | (2) | (2) | (2) | (2) | (2) | (2) |
| Phenol resin | (2) | (2) | (2) | (2) | (2) | (2) | (2) |
| Carbon content ratio (wt %) | 4.2 | 4.8 | 4.1 | 4.5 | 4.1 | 4.1 | 4.3 |
| Modulus of rupture (MPa) | 19 | 15 | 17 | 19 | 11 | 18 | 21 |
| Corrosion resistance* | 100 | 100 | 105 | 110 | 120 | 140 | 130 |
| Thermal spalling resistance** | None | None | None | None | Medium | Low | Medium |
| Fracture resistance parameter (R)*** | 1 | 1.3 | 1.4 | 1.5 | 0.8 | 0.9 | 0.7 |

The values surrounded by parentheses indicate the ratio relative to the weight of the all other components.
*The smaller the corrosive resistance is the better.
**"None," "Low" or "Medium" indicates the degree of crack generation.
***The fracture resistance parameters are indices with the value of Example 1 being 1, and the larger the value is the better.

The invention claimed is:

1. A component of a pitch-containing refractory raw material, the component consisting essentially of:
    a plurality of secondary particles, each one of the secondary particles respectively consisting of (a) a carrier particle and (b) primary particles of pitch, having a softening point in the range of 70 to 200° C., attached and held on the surface of the respective carrier particle;
    wherein these secondary particles provide a uniform dispersion of the primary particles of pitch without any aggregations in the refractory raw material.

2. The component of a pitch-containing refractory raw material according to claim 1, wherein the average diameter of the secondary particles is equal to or smaller than 50 μm.

3. The component of a pitch-containing refractory raw material according to claim 2, wherein the average diameter of the primary particles of pitch held on the surfaces of the carrier particles is equal to or smaller than 30 μm.

4. The component of a pitch-containing refractory raw material according to claim 3, wherein the content ratio of the pitch is in the range of 10 to 50 wt % and the balance is carrier particles.

5. The component of a pitch-containing refractory raw material according to claim 2, wherein the content ratio of the pitch is in the range of 10 to 50 wt % and the balance is carrier particles.

6. The component of a pitch-containing refractory raw material according to claim 1, wherein the average diameter of the primary particles of pitch held on the surfaces of the carrier particles is equal to or smaller than 30 μm.

7. The component of a pitch-containing refractory raw material according to claim 6, wherein the content ratio of the pitch is in the range of 10 to 50 wt % and the balance is carrier particles.

8. The component of a pitch-containing refractory raw material according to claim 1, wherein a content ratio of the pitch is in the range of 10 to 50 wt % and the balance is carrier particles.

9. A method for producing a carbon-containing refractory including the component of claim 1, wherein the primary particles of pitch have a softening point in the range of 70 to 200° C. and an average particle diameter equal to or smaller than 30 μm, the method comprising
    a first step of holding the primary particles on the surfaces of carrier particles to form a plurality of the secondary particles, and
    a second step of adding the secondary particles into a refractory raw material formulation so that the weight of the plurality of secondary particles is in the range of 3 to 30 wt % of the total weight of the other portion of the refractory raw material formulation, and then uniformly mixing the secondary particles and the other portion to form a carbon-containing refractory.

10. The method for producing a carbon-containing refractory according to claim 9, wherein the secondary particles and the refractory raw material formulation contain carbon materials, and the overall content ratio of carbon including these materials is set so that the overall content ratio of carbon in the carbon-containing refractory is equal to or smaller than 15 wt % but is not zero.

11. The method for producing a carbon-containing refractory according to claim 9, further comprising a third step of heat-treating the carbon-containing refractory produced in the second step at temperatures in the range of 500 to 1200° C.

* * * * *